United States Patent [19]

Rogers, III

[11] Patent Number: 4,598,316
[45] Date of Patent: Jul. 1, 1986

[54] BRIGHTNESS CONTROL NETWORK IN A VIDEO SIGNAL PROCESSOR WITH AC COUPLED OUTPUT STAGES

[75] Inventor: Robert L. Rogers, III, Lancaster, Pa.

[73] Assignee: RCA Corporation, Princeton, N.J.

[21] Appl. No.: 532,333

[22] Filed: May 31, 1983

[51] Int. Cl.[4] .......................... H04N 5/57; H04N 9/77
[52] U.S. Cl. .................................................. 358/168
[58] Field of Search .................. 358/167, 166, 33, 168

[56] References Cited

U.S. PATENT DOCUMENTS

| 3,272,914 | 9/1966 | Moles et al. | 358/30 |
|---|---|---|---|
| 3,499,104 | 3/1970 | Austin | 358/30 |
| 4,091,419 | 5/1978 | Rhee | 358/168 |
| 4,135,200 | 1/1979 | Shanley, II | 358/168 |
| 4,204,221 | 5/1980 | Shanley | 358/168 |
| 4,285,008 | 8/1981 | Osawa et al. | 358/65 |

FOREIGN PATENT DOCUMENTS

| 3048486 | 1/1982 | Fed. Rep. of Germany . |
| 1315456 | 5/1973 | United Kingdom . |

OTHER PUBLICATIONS

"Funk-Technik", No. 15, 1967, pp. 538–540 (with translation).

Primary Examiner—Tommy P. Chin
Attorney, Agent, or Firm—P. J. Rasmussen; P. M. Emanuel; R. H. Kurdyla

[57] ABSTRACT

Brightness control apparatus for a video signal processing system wherein the video signal is pre-conditioned to establish a prescribed reference level during image blanking intervals. The prescribed reference level is afterwards further modified by adding a black-going pulse component to the video signal during the blanking intervals. The magnitude of the added pulse component is adjusted in accordance with the setting of an adjustable brightness control to control the brightness of images displayed by an image display device included in the system. Controlled video signals are AC coupled to an intensity control electrode of the display device by a DC restoration circuit which responds to the magnitude of the added blanking interval pulse component, for establishing the DC bias of intensity control electrode and thereby image brightness.

9 Claims, 4 Drawing Figures

BRIGHTNESS CONTROL NETWORK IN A VIDEO SIGNAL PROCESSOR WITH AC COUPLED OUTPUT STAGES

This invention concerns apparatus for controlling the brightness of an image displayed by a video signal processing and display system such as a video signal monitor, for example.

Video signal processing systems such as television receivers and video monitors sometimes employ video output amplifier stages which are AC coupled to intensity control electrodes of an image display device such as a kinescope. Associated with the output AC coupling networks are respective DC restoration networks for re-establishing the DC bias potential of the intensity control electrodes at a desired level. The AC coupling mechanism also permits a reduced level of operating supply potential to be used with the video output stages, compared to the level of operating supply potential associated with DC coupled video output stages.

Brightness control apparatus in accordance with the present invention is particularly useful in conjunction with a video processing and display system having AC coupled video output stages. The disclosed brightness control apparatus is included in a system comprising a video channel for processing a video signal having image and blanking intervals, and an image display device. In accordance with the brightness control function, the video signal is first pre-conditioned by modifying the amplitude characteristic of the video signal during the blanking intervals, to establish a prescribed reference level during blanking intervals. Afterwards a pulse component with black-going polarity is added to the video signal during the blanking intervals. The brightness of a reproduced image is varied by adjusting the magnitude of the added pulse component such as by means of a manually adjustable resistance.

In accordance with a feature of the invention, additional image brightness control is accomplished by means of an auxiliary adjustable resistance which also controls the magnitude of the added blanking interval pulse component.

In accordance with a further feature of the invention, video signals processed by the brightness control apparatus are AC coupled to an intensity control electrode of the image display device. The AC coupled signals are DC restored by means of a DC restoration circuit in accordance with the magnitude of the added blanking interval pulse component.

Figure 1:
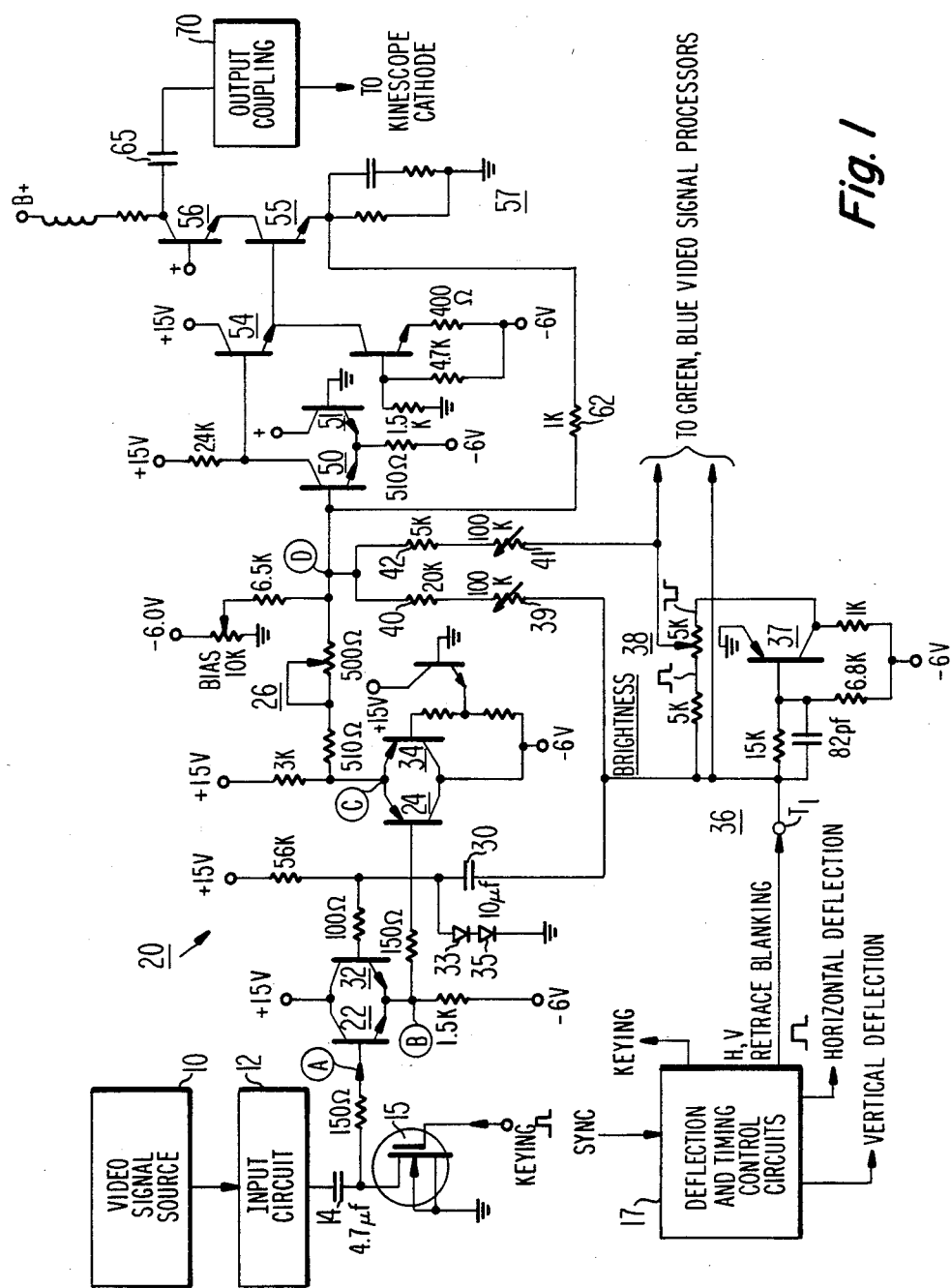
FIG. 1 shows a portion of a video signal processing system including brightness control apparatus according to the present invention.

The video signal processing system shown in FIG. 1 corresponds to a high definition video signal processing and display system which can be used in broadcast studios to monitor the quality of video signals to be broadcast, as well as in conjunction with systems intended to display alphanumeric characters. Systems of the latter type can include dedicated display monitors associated with computer terminals.

Except as otherwise noted, the system of FIG. 1 constitutes one of three similar channels of a color video signal processing system intended to process three separate red, green and blue image representative color signals via respective channels.

Figure 3:
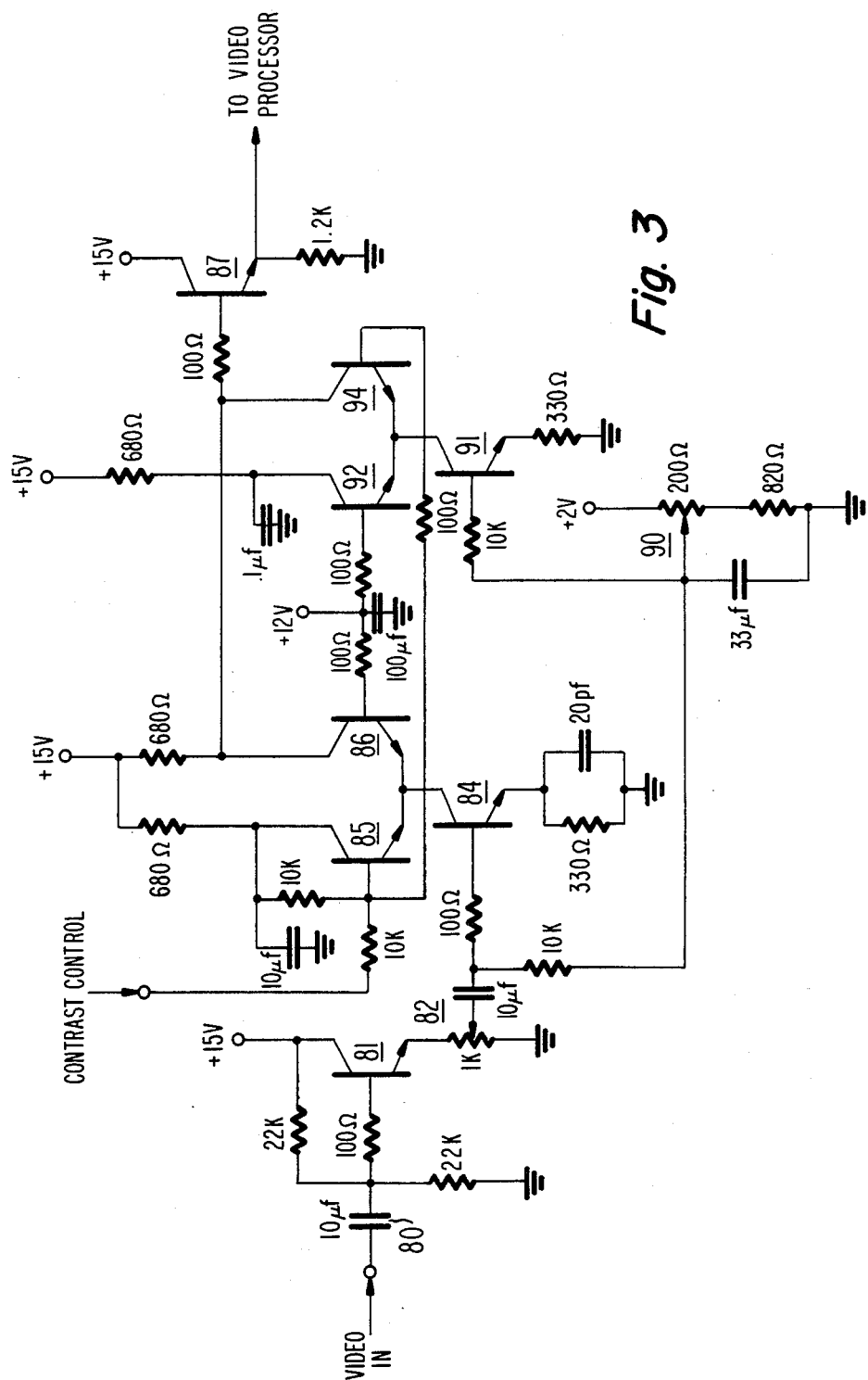
FIGS. 3–4 show circuit details of portions of the system of FIG. 1.

In FIG. 1, a source of video signals 10 (e.g., red color image signals such as may be derived from a color camera) supplies video signals to an input signal translating circuit including signal amplifying and gain control circuits for example, as will be shown in greater detail in connection with FIG. 3. Signals from input circuit 12 are AC coupled via a capacitor 14 which together with a keyed MOS-type Field Effect Transistor 15 comprises an input DC restoration circuit. Transistor 15 is keyed to conduct during so-called "back porch" intervals of each horizontal line blanking interval in response to KEYING pulses derived from deflection and timing control circuits 17. The latter circuits respond to video signal image synchronizing (SYNC) signals for also developing HORIZONTAL DEFLECTION and VERTICAL DEFLECTION signals which are applied to an image reproducing kinescope of the system of properly timing the horizontal and vertical image scanning of the kinescope. Circuits 17 also provide output H and V timing signals which occur during horizontal and vertical image retrace blanking intervals. The SYNC signal input to circuits 17 can be supplied from an external synchronizing signal source. Alternatively, the SYNC signal can correspond to a separated SYNC component of a composite video signal.

Figure 2:
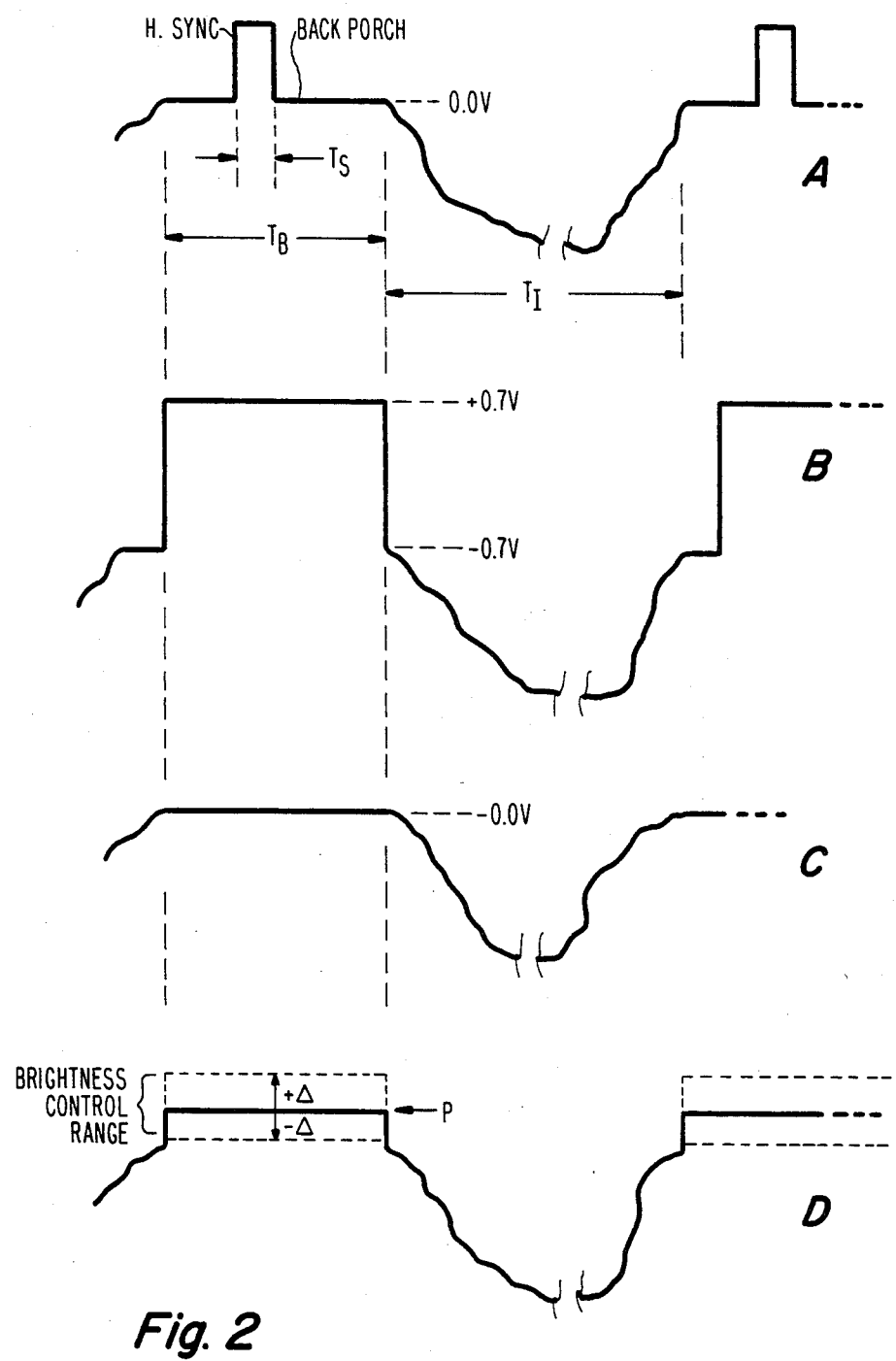
FIG. 2 depicts signal waveforms helpful in understanding the operation of the system of FIG. 1.

The following discussion of the system of FIG. 1 is made with reference to the waveforms of FIG. 2.

The DC restored input signal is applied to a video processor circuit 20 including an input NPN emitter follower transistor 22. The input signal applied to follower 22 is designated by waveform A shown in FIG. 2. As seen from FIG. 2, this input signal includes horizontal image blanking (retrace) intervals $T_B$ succeeded by horizontal image scanning (trace) intervals $T_I$. Blanking interval $T_B$ comprises, in sequence, a so-called "front-porch" interval which precedes a sync pulse interval $T_S$ containing a positive horizontal synchronizing (sync) pulse, and a so-called "back porch" interval following the sync interval. Signal A as shown corresponds to a "sync-tip positive" signal wherein positive-going and negative-going signal transitions respectively correspond to black and white image information.

The video signal from NPN follower 22 is applied to a PNP emitter follower transistor 24 which together with follower 22 provides a temperature compensated signal coupling network. Signals developed in the emitter circuit of transistor 24 are applied via adjustable resistor 26, which may be preset for gain adjustment purposes, to an amplifier circuit including a transistor 50 as will be discussed subsequently.

The brightness control function will now be described.

It is first noted that ground reference potential (0.0 volts) is employed as a reference voltage in conjunction with the brightness control function, since ground potential is predictable and represents a reliable reference point. As indicated by waveform A in FIG. 2, the blanking pedestal level of the blanking interval is set at ground potential (0.0 volts) via the action of the input DC restorer comprising capacitor 14 and transistor 15.

During each horizontal and vertical image blanking interval, positive pulses H and V, as applied to a terminal $T_1$, are coupled via a capacitor 30 for rendering transistor 32 conductive during retrace blanking intervals. Transistor 32 is otherwise non-conductive. Diodes 33,35 clamp the H and V signals which are coupled from capacitor 30 to the base of transistor 32 to approximately +1.4 volts. The conductive state of transistor 32 renders input transistor 22 non-conductive during the blanking intervals and causes a positive pulse to be developed at the joined emitters of transistors 22,32 during the blanking intervals. This effect is illustrated by waveform B shown in FIG. 2. As seen from FIG. 2, the video signal exhibits a positive pulse component of +1.4 volts magnitude during the blanking interval, e.g., from a level of −0.7 volts to a level of +0.7 volts. The −0.7 volt level is attributable to the 0.7 volt drop across the base-emitter junction of input transistor 22 relative to the 0.0 volt level at its base (see waveform A). The +0.7 volt level is attributable to the 0.7 volt drop across the base-emitter junction of transistor 32 relative to the +1.4 volt pulse applied to its base. The magnitude of the developed blanking interval pulse corresponds to a significant black-going increase in the video signal blanking interval level and exceeds the normally expected magnitude of the sync pulse, which can vary.

The base of a signal limiting transistor 34, connected to transistor 24 as shown, is biased at approximately −0.7 volts. Thus transistor 34 is forward biased to conduct whenever its emitter potential reaches 0.0 volts, corresponding to the selected reference level. In this regard it is noted that the blanking interval pulse appearing at the base of transistor 24 (waveform B) exhibits a peak-to-peak amplitude of 0.0 volts to +1.4 volts at the emitter of transistor 24. However, the magnitude of the blanking interval pulse component at the emitter of transistor 24 is limited to 0.0 volts by the clamping action of transistor 34. Specifically, transistor 34 is forward biased to conduct when the blanking interval emitter potential of transistor 24 reaches 0.0 volts. Thus during blanking intervals the emitter signal of transistor 24 is clamped to the fixed base bias voltage of transistor 34 (−0.7 volts) plus the base-emitter junction voltage drop of transistor 34 (0.7 volts), or 0.0 volts. This effect is indicated by waveform C in FIG. 2. Thus transistor 34 serves to limit the video signal to the desired 0.0 volt reference level during blanking intervals. In this manner the blanking interval component of the video signal from the emitter of transistor 24 is modifefed or pre-conditioned with respect to the requirements of the brightness control network. The pre-conditioning of the video signal prevents the pulse controlled brightness control function, which will be described subsequently, from being adversely affected by sync components or various forms of spurious signals, whereby brightness control is achieved in a predictably accurate manner.

The brightness control network includes a circuit 36 including a transistor 37, a manually adjustable brightness control potentiometer 38, and separate brightness control signal coupling paths respectively comprising resistors 39,40 and 41,42. The blanking interval pulses as applied to terminal T$_1$ are coupled via pre-set adjustable resistor 39 and resistor 40 to the base of transistor 50, where a signal current of the form indicated by waveform D is produced as shown in FIG. 2. Waveform D includes a blanking interval reference pulse component of given magnitude P, which may be adjusted via resistor 39 during alignment of the system.

Positive blanking interval pulses from terminal T$_1$ are also applied to the left end of brightness control 38. The blanking interval pulses from terminal T$_1$ are inverted by transistor 37 such that negative-going blanking interval pulses appear at the right end of brightness control 38. Selected portions of the positive and negative blanking interval pulses are coupled via the wiper of control 38, adjustable resistor 41 and resistor 42 to the base of transistor 50. Adjustment of control 38 causes the amplitude P of the added pulse component to vary by amounts $+\Delta$ and $-\Delta$ during blanking intervals which, in combination with the action of clamp circuits coupled to the video output kinescope driver stage as will be discussed, varies the brightness of a reproduced image. Circuit 36 and brightness control 38 operate in common with all three video signal channels. Brightness control 38 may include a reference detent position corresponding to the center setting of the control at which no net blanking interval pulses appears at the wiper of control 38. This may be considered a black reference setting at which the video signal at the base of transistor 50 exhibits the level of reference pulse P during blanking intervals.

Adjustable resistor 41 corresponds to a "brightness tracking" control which is intended to be employed during alignment of the system. Adjustable resistor 41 is employed to compensate for the fact that the conduction characteristics of kinescope electron guns are not uniform or predictable, and may vary widely as a function of manufacturing tolerances and aging, for example. Corresponding adjustable control resistors are associated with the other two video channels. The "brightness tracking" adjustable resistors permit drive balance to be achieved during system alignment to assist in establishing correct electron gun drive ratios, as follows. In such an alignment procedure, video signal information except for sync information is inhibited and vertical scanning of the kinescope is collapsed by defeating the vertical deflection circuits. This produces a narrow horizontal "set-up" line across the face of the kinescope. Brightness control 38 is set to its midrange (e.g., detented) black reference position. Potentiometers associated with each of the output clamps in output network 70 for each channel (as shown in detail in FIG. 4) are individually adjusted until the narrow "set-up" line on the face of the kinescope is barely visible. In conjunction with this adjustment the adjustable "brightness tracking" resistors are varied to produce the correct drive ratios for each of the kinescope electron guns. By this adjustment for each channel, the reference level P of the added blanking interval brightness pulse (waveform D) for each channel is slightly increased or decreased via the adjustable brightness tracking resistors in accordance with the correct drive ratio for the associated kinescope electron gun. After this procedure is complete, each channel will exhibit an amount of brightness change, for a given amount of rotation of the brightness contol, depending upon the amount by which the brightness tracking control resistors were adjusted. Thus the three color signal channels can exhibit different DC level changes (brightness changes) for a given amount of rotation of brightness control 38. This alignment procedure involving the brightness tracking controls produces more accurate rendition of white-going information in the vicinity of black information, a condition to which viewers have been found to be particularly sensitive.

The signal represented by waveform D is applied to a pre-amplifier circuit included transistor 50 and an associated emitter coupled transistor 51 arranged in a differential input amplifier configuration. A ground reference voltage is applied to the base of transistor 51, which corresponds to the non-inverting amplifier input. The base of transistor 50 corresponds to the amplifier inverting signal input. Amplified video signals from the collector output circuit of transistor 50 are coupled via an emitter follower buffer transistor 54 to a kinescope driver stage. The kinescope driver includes a lower rank, video input common emitter amplifier transistor 55 arranged in a cascode amplifier configuration with an upper rank, video output common base amplifier transistor 56. The emitter circuit of transistor 55 includes an RC signal peaking network 57 which increases the signal gain of the kinescope driver at higher video signal frequencies. Degenerative video signal feedback for the kinescope driver is provided by means of a resistor 62 coupled from the low impedance emitter of transistor 55 to the signal input of pre-amplifier transistor 50. The degenerative feedback serves to linearize the emitter signal current of kinescope driver input transistor 55, which in turn linearizes the output signal current conducted by transistor 56. This and other aspects of the kinescope driver stage are discussed in my U.S. Pat. No. 4,547,799 titled "Feedback Kinescope Driver".

The circuit including transistors 50,51 together with transistors 54 and 55 and feedback resistor 62 corresponds to a feedback operational amplifier. The base input of transistor 50 corresponds to a current summing junction and a virtual ground inverting input of the operational amplifier. A ground reference potential for the operational amplifier is applied to the non-inverting amplifier input of the amplifier at the base of transistor 51. Waveform D is indicative of a signal waveform which appears at the emitter of transistor 55, but in inverted form.

The video output signal from transistor 56 (i.e., an amplified version of waveform D in FIG. 2) is AC coupled via a capacitor 65 and a coupling network 70 to a kinescope cathode electrode. Coupling network 70 includes a clamping circuit which responds to the (variable) peak amplitude of the added blanking interval pulse component for adjusting the charge on capacitor 65, and thereby the kinescope cathode bias, in accordance with the brightness representative magnitude of the added blanking interval pulse component. The brightness of a reproduced image is adjusted accordingly. Details of the output clamping circuit will be discussed in connection with FIG. 4.

The AC coupling of the video output signals via capacitor 65 and the use of subsequent DC restoration circuits (clamps) included in output coupling network 70 is advantageous in that the operating supply voltage (B+) required for the video output stages can be significantly reduced (e.g., by 35% or more) compared to the operating supply voltage required for a DC coupled video output stage. This results because with AC coupling and the DC restoration circuit the output potential of the kinescope driver stage need not include additional range to account for the fact that the conduction characteristics (e.g., cut-off level) of the kinescope electron guns can vary due to a variety of factors including manufacturing tolerances, aging and temperature effects. This feature of the disclosed system is particularly advantageous in a system wherein the kinescope driver stage is intended to process wideband (e.g., 30 MHz) video signals, since video output transistors capable of handling such high frequency signals become increasingly expensive as their high voltage rating increases.

FIG. 3 shows details of input circuit 12 in FIG. 1. Video input signals are AC coupled via a capacitor 80 to an emitter follower transistor 81, which includes a pre-set gain control potentiometer 82 in its emitter circuit. Signals from follower transistor 82 are coupled via a current source transistor 84 to an amplifier stage comprising emitter coupled transistors 85 and 86. A viewer adjustable manual contrast control (e.g., a potentiometer) can be coupled to the base of transistor 85 for varying the peak-to-peak amplitude of video signals processed by amplifier 85,86. Output signals from the collector circuit of transistor 86 are coupled via an emitter follower transistor 87 to the video processor network of FIG. 1. An adjustable control 90 connected to current source transistor 84 and to a current source transistor 91 associated with emitter coupled transistors 92 and 94 can be used to compensate for DC level shifts which may occur as a result of varying the peak-to-peak amplitude of the video signal via the gain controls.

Figure 4:
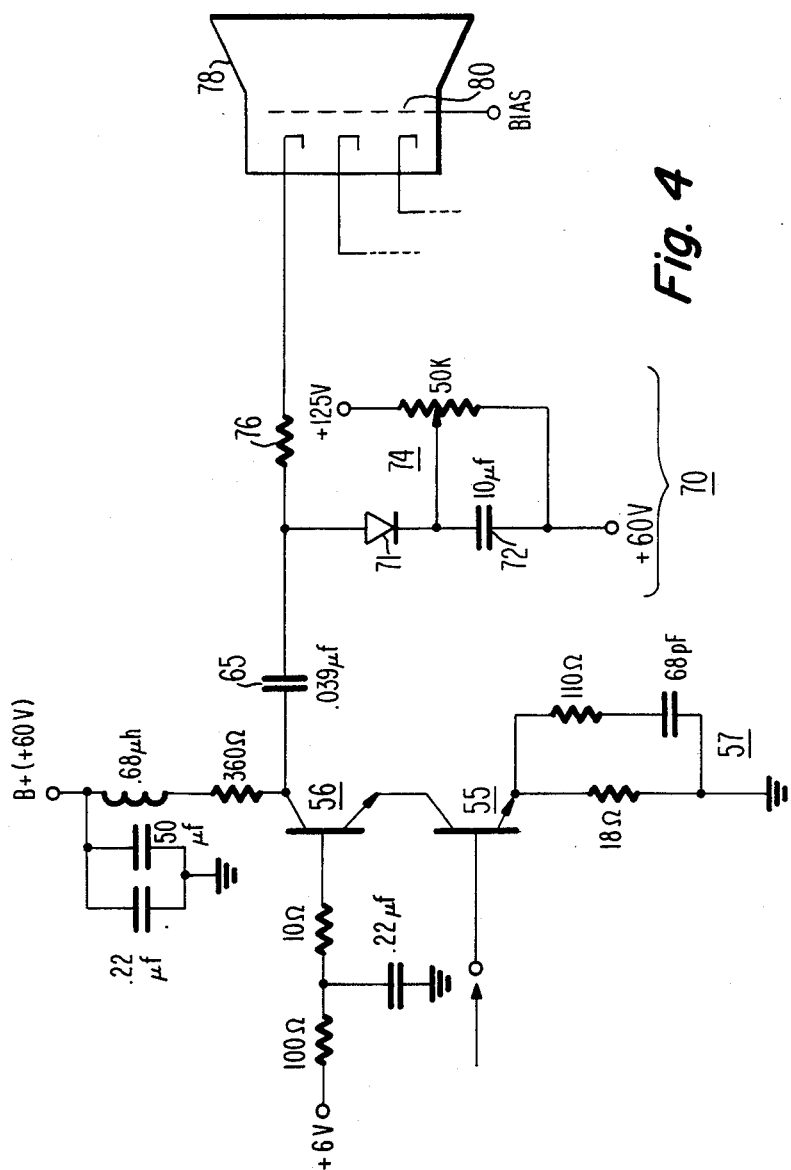

FIG. 4 shows details of the output coupling network 70 connected between the output of the kinescope driver stage and the kinescope, as mentioned in connection with FIG. 1. Corresponding elements in FIGS. 1 and 4 are identified by the same reference number.

As shown in FIG. 4, coupling network 70 includes a clamping circuit with a diode 71, a capacitor 72, and a potentiometer 74 arranged as shown. The clamping circuit coacts with capacitor 65 to form a clamp to establish the DC bias of the associated cathode of kinescope 78 in accordance with the magnitude of the image brightness representative pulse which appears during blanking intervals. Kinescope 78 is of the self-converging "in-line" gun type with a control grid 80 biased in common with respect to each of the plural cathode electrodes, which comprise plural electron guns together with grid 80. Diode 71 is rendered conductive during blanking intervals to modify the charge on capacitor 65 in accordance with the variable magnitude of the added positive blanking interval pulse and the setting of potentiometer 74. Potentiometer 74 may be used during system alignment for setting the black current conduction level of the associated kinescope cathode, at which time adjustable brightness control 38 (FIG. 1) preferably would be set at its detented midrange black reference position. A resistor 76 provides protection against excessive currents induced by kinescope arcing.

The output DC restoration clamping circuits advantageously are not keyed. Keyed clamps are considered to be undesirable because keying signals applied in the vicinity of the output circuits increase the likelihood of spurious switching signal components contaminating the video information signal being applied to the kinescope.

What is claimed is:
1. A system including a video channel for processing a video signal comprising image blanking intervals, an image display device having an input intensity control electrode for receiving a video output signal from said video channel, and apparatus included in said video channel for controlling the brightness of a displayed image, said apparatus comprising:

signal conditioning means for modifying the amplitude characteristic of said video signal normally present during said image blanking intervals, to establish a modified video signal with a prescribed reference level during said image blanking intervals;

means for adding a pulse component having a peak amplitude in a black image direction to said modified video signal during said blanking intervals; and control means for adjusting the magnitude of said pulse component to control the brightness of a displayed image in accordance with the setting of said control means, to thereby produce said video output signal with an image brightness representative pulse component.

2. Apparatus according to claim 1, wherein said signal conditioning means comprises signal modifying means for significantly increasing the magnitude of said video signal in a black-going direction during said image blanking intervals to thereby produce a black-going blanking interval component; and means for limiting the magnitude of said blanking interval component of said video signal produced by said signal modifying means to produce said prescribed reference level during said image blanking intervals.

3. Apparatus according to claim 1 and further comprising

DC restoration means preceding said signal conditioning means and operative during said blanking intervals.

4. Apparatus according to claim 1 and further comprising auxiliary control means for providing additional adjustable control of the magnitude of said added pulse component.

5. Apparatus according to claim 4, wherein said control means comprises a manually adjustable resistance coupled to said video channel via a brightness control path; and said auxiliary control means comprises a manually adjustable resistance coupled to said brightness control path.

6. Apparatus according to claim 1 and further comprising a video signal output driver amplifier for providing an amplified version of said video output signal;

means for AC coupling said video output signal to said intensity control electrode of said image display device; and video signal DC restoration means cooperative with said AC coupling means for establishing the bias of said intensity control electrode, and thereby the brightness of said displayed image, in accordance with the magnitude of said pulse component.

7. Apparatus according to claim 6, wherein said DC restoration means comprises unkeyed threshold conduction means responsive to said pulse component.

8. Apparatus according to claim 6, wherein said image display device corresponds to a kinescope; and said intensity control electrode corresponds to a cathode electrode.

9. Apparatus according to claim 1, wherein said control means comprises a source of pulse signals occurring during image blanking intervals;

manually adjustable resistance means having plural input terminals, and an adjustable output tap coupled to said video channel; and means for providing mutually oppositely phased versions of said pulse signals to said input terminals of said adjustable resistance means, respectively; wherein adjustment of said output tap couples a combined pulse signal to said video channel for varying the brightness of said displayed image, said combined pulse signal comprising amplitude portions of said oppositely phase pulse signals selected in accordance with the setting of said adjustable output tap.

* * * * *